(12) United States Patent
Schneider et al.

(10) Patent No.: US 9,688,033 B2
(45) Date of Patent: Jun. 27, 2017

(54) APPARATUS AND METHOD FOR WORKING AN OPTICAL LENS

(75) Inventors: Gunter Schneider, Marburg (DE); Helwig Buchenauer, Dautphetal-Buchenau (DE)

(73) Assignee: Schneider GmbH & Co. KG, Fronhausen (DE)

( * ) Notice: Subject to any disclaimer, the term of this patent is extended or adjusted under 35 U.S.C. 154(b) by 379 days.

(21) Appl. No.: 13/989,221

(22) PCT Filed: Nov. 21, 2011

(86) PCT No.: PCT/EP2011/005847
§ 371 (c)(1),
(2), (4) Date: May 23, 2013

(87) PCT Pub. No.: WO2012/069168
PCT Pub. Date: May 31, 2012

(65) Prior Publication Data
US 2013/0249130 A1    Sep. 26, 2013

(30) Foreign Application Priority Data

Nov. 23, 2010  (EP) .................................... 10014889

(51) Int. Cl.
*B24B 1/00* (2006.01)
*B29D 11/00* (2006.01)
*B24B 13/005* (2006.01)

(52) U.S. Cl.
CPC .... *B29D 11/00317* (2013.01); *B24B 13/0055* (2013.01)

(58) Field of Classification Search
CPC ............ B24B 13/0055; B24B 13/0052; B29D 11/00317
See application file for complete search history.

(56) References Cited

U.S. PATENT DOCUMENTS

| 4,019,289 | A | | 4/1977 | Korver |
| 4,358,913 | A | * | 11/1982 | Sorrells ............... B24B 13/0057 451/390 |
| 5,485,399 | A | | 1/1996 | Saigo et al. |
| 5,520,568 | A | * | 5/1996 | Craighead ........... B24B 13/0057 24/584.1 |
| 5,808,894 | A | | 9/1998 | Wiens et al. |
| 5,967,879 | A | | 10/1999 | Gottschald |
| 6,271,102 | B1 | * | 8/2001 | Brouillette ........... B23D 59/002 257/E21.518 |
| 6,568,990 | B2 | | 5/2003 | Siders et al. |
| 6,659,098 | B1 | | 12/2003 | Sekiya |
| 6,785,585 | B1 | | 8/2004 | Gottschald |
| 6,813,536 | B1 | | 11/2004 | Gottschald |
| 6,953,381 | B2 | | 10/2005 | Siders et al. |
| 7,086,928 | B2 | | 8/2006 | Siders et al. |

(Continued)

FOREIGN PATENT DOCUMENTS

DE        198 04 542 A1     8/1999
DE   10 2006 050 426 A1     4/2008
(Continued)

*Primary Examiner* — Galen Hauth
(74) *Attorney, Agent, or Firm* — David S. Safran

(57) ABSTRACT

An apparatus and a method for processing an optical lens, whereby a block piece for the lens is first processed by cutting and then is provided with markings for positioning the lens on the block piece.

4 Claims, 4 Drawing Sheets

(56) References Cited

U.S. PATENT DOCUMENTS

| | | |
|---|---|---|
| 7,111,938 B2 | 9/2006 | Andino et al. |
| 7,128,638 B2 | 10/2006 | Siders et al. |
| 7,371,154 B2 | 5/2008 | Siders et al. |
| 7,422,510 B2 | 9/2008 | Schneider et al. |
| 7,437,809 B2 | 10/2008 | Yamamoto et al. |
| 7,476,143 B2 | 1/2009 | Shibata |
| 7,828,624 B2 | 11/2010 | Siders et al. |
| 7,980,920 B2 | 7/2011 | Akiyama et al. |
| 8,387,224 B2 | 3/2013 | Arai et al. |
| 2004/0242128 A1 | 12/2004 | Masuko |
| 2005/0077639 A1 | 4/2005 | Foreman et al. |
| 2005/0255406 A1 | 11/2005 | Assa |
| 2005/0280542 A1 | 12/2005 | Shieh |
| 2006/0061476 A1 | 3/2006 | Patil et al. |
| 2006/0164236 A1 | 7/2006 | Siegl et al. |
| 2007/0141950 A1 | 6/2007 | Shibata et al. |
| 2008/0026679 A1 * | 1/2008 | Siders .................... B24B 13/06 451/42 |
| 2008/0051012 A1 * | 2/2008 | Akiyama ................ B24B 9/146 451/42 |
| 2008/0055542 A1 | 3/2008 | Haddadi |
| 2008/0132147 A1 | 6/2008 | Takeichi |
| 2008/0132157 A1 | 6/2008 | Schneider et al. |
| 2009/0067940 A1 | 3/2009 | Arai et al. |
| 2009/0302122 A1 | 12/2009 | Begon |
| 2010/0224039 A1 | 9/2010 | Schneider et al. |
| 2010/0248590 A1 | 9/2010 | Shibata et al. |
| 2010/0250173 A1 | 9/2010 | Kozu |
| 2011/0009035 A1 | 1/2011 | Schneider |
| 2011/0096290 A1 | 4/2011 | Schneider et al. |
| 2011/0220519 A1 | 9/2011 | Meschenmoser et al. |
| 2011/0256806 A1 | 10/2011 | Monnoyeur |
| 2011/0281502 A1 | 11/2011 | Siders et al. |
| 2011/0320029 A1 | 12/2011 | Buchet et al. |

FOREIGN PATENT DOCUMENTS

| | | |
|---|---|---|
| DE | 10 2007 007 188 A1 | 8/2008 |
| DE | 10 2007 042 667 A1 | 3/2009 |
| DE | 10 2008 022 660 A1 | 11/2009 |
| DE | 10 2008 041 945 A1 | 3/2010 |
| DE | 10 2009 011 194 A1 | 9/2010 |
| EP | 0 576 268 A1 | 12/1993 |
| EP | 0 849 038 A2 | 6/1998 |
| EP | 1 099 511 A2 | 5/2001 |
| EP | 1 295 962 A1 | 3/2003 |
| EP | 1 762 337 A1 | 3/2007 |
| EP | 1 847 869 A1 | 10/2007 |
| EP | 1 955 811 A2 | 8/2008 |
| EP | 2 308 644 A2 | 4/2011 |
| FR | 2 937 574 A1 | 4/2010 |
| JP | 02-172643 A | 7/1990 |
| WO | 01/53038 A1 | 7/2001 |
| WO | 2005/105372 A1 | 11/2005 |
| WO | 2006/046558 A1 | 5/2006 |
| WO | 2007/017385 A2 | 2/2007 |

* cited by examiner

APPARATUS AND METHOD FOR WORKING AN OPTICAL LENS

BACKGROUND OF THE INVENTION

Field of the Invention

This invention relates to an apparatus for processing an optical lens, with a processing apparatus for cutting or other shape-giving processing of a front surface of a block piece for the lens, and in particular, for cutting or other shape-giving processing of the lens, as well as a method for processing an optical lens.

Description of Related Art

An optical lens, for example, for eyeglasses, is to have certain optical properties. The associated desired optical data of the lens are determined by, for example, an optician. These data comprise, for example, the indication of diopters, data regarding sphere and cylinder, pantoscopic angle, etc. In addition, these desired optical data can also contain the distance from and/or the position relative to an assigned eye, in particular in the case of incorporation in a certain eyeglass frame, e.g., the pantoscopic angle, facial angle or face form angle, interpupillary distance, etc.

In the past, lenses with predetermined optical data, for example, with diopters available in various stages, were used. To an increasing extent, however, lenses are used that have individualized optical data that are desired in each case or the associated optical properties. Such lenses are then processed or finished based on the optical data that are desired in each case, whereby the lenses are provided in particular with so-called free-form surfaces (for example, progressive-addition lenses, etc.). The description below and this invention preferably relate to those lenses or lens blanks that are processed according to the desired, individualized optical data and are provided in particular with the thus mentioned free-form surfaces.

German Patent Application DE 10 2007 007 188 A1 discloses a processing center for processing an optical lens that is made of plastic. It has a workpiece spindle that rotates around a rotational axis, with a receptacle for a lens. The processing center also has a processing apparatus with a milling tool, a processing apparatus with a turning tool, a polishing apparatus, a cleaning apparatus, and a marking or an engraving apparatus for a processed lens. In principle, DE 10 2007 007 188 A1 shows an apparatus in the form of a processing center; however, nothing is explained regarding the control unit and the input apparatus German Patent Application DE 10 2008 022 660 A1 and corresponding U.S. Patent Application Publication 20011/0096290 disclose a method for processing a lens, whereby the lens that is to be processed is temporarily fastened (locked) to a so-called block piece as a holding apparatus.

International Patent Application Publication WO 2007/017385 A2 and corresponding U.S. Patent Application Publication 2008/0132157 disclose a block piece that is made of plastic, which is machined, adapted to the lens that is to be processed.

French Patent Application FR 2 937 574 A1 and corresponding U.S. Patent Application Publication 2011/0256806 relate to the processing of a lens. An unblocked lens is held by a vacuum chuck and processed on the free surface side. Then, the lens is marked with a laser on the processed surface side. The lens is then further rotated and accommodated and held by the vacuum chuck with its processed and marked surface side in order to be able to process the other surface side. The markings in this case are used for an orientation or position acquisition of the lens to avoid re-measurement of the lens or to make more exact processing possible. FR 2 937 574 A1 and corresponding U.S. Patent Application Publication 2011/0256806, however, do not provide any block piece as a holding means for the lens and consequently discloses neither a processing of a block piece nor a marking of a processed side of the block piece for positioning the lens on the block piece.

European Patent Application EP 1 762 337 A1 and corresponding U.S. Pat. No. 7,980,920 deal with the processing of eyeglass lenses, whereby the latter are provided with first and second reference markings for simplifying the processing. Processing and marking of a block piece are not described.

European EP 0 576 268 A1 and corresponding U.S. Pat. No. 5,485,399 relate to the eyeglass lens processing, whereby a lens is provided with a marking to secure the locking of a block piece on the lens in a desired position. A processing and marking of the block piece itself are not disclosed.

German Patent Application DE 198 04 542 A1 and corresponding U.S. Pat. No. 6,813,536 relate to the edge processing of an eyeglass lens, whereby the eyeglass lens is marked. A processing and marking of a block piece are not disclosed.

SUMMARY OF THE INVENTION

The object of this invention is to provide an apparatus and a method for processing an optical lens, whereby binding of the lens and/or processing can be done, in particular, on the spot, for example, right in an optician's office or the like and/or at low organizational expense, and/or whereby special processing work is also made possible or facilitated.

The above object is achieved by an apparatus and a method as described herein.

One aspect of this invention is that a block piece for (temporary) receiving or holding of the lens that is to be processed for, in particular, translatory and/or rotary positioning marks the lens on the block piece or is provided with markings, preferably after the block piece or its front side was processed in particular on the spot and/or in the apparatus for processing the lens in a cutting, machining or some other shape-giving way. This makes possible and facilitates the (correct) positioning of the lens on the block piece and then correspondingly also the correct connection of the lens to the block piece. This further facilitates the processing of the lens.

In particular, the mating surface for the lens, namely a front side, of the block piece is processed or produced and then marked, in particular corresponding to a related lens identification or marking, so that a special chuck or other holding means for different lenses is not necessary or can be omitted.

The correct positioning of the lens on the block piece is especially problematic for special processing work of the lens, for example, when the lenses are provided with a prism, in particular, for correcting strabismus. It is further possible or partially necessary to adapt the block piece to a side that is be locked or the surface of the lens by corresponding processing of the block piece and then to mark, before the lens can be (temporarily) fastened, i.e., locked, with this side or surface onto the processed block piece, to be able to process the other side or surface of the lens and/or the lens edge.

Especially preferably, the cutting processing, machining or other shape-giving processing of the block piece is carried out with a processing apparatus or in an apparatus that also uses the cutting or other shape-giving processing of the lens. This allows for a simple structure and/or a processing in particular on the spot, for example, in an optician's office.

The block piece is especially preferably marked by means of a marking apparatus, which also uses a marking of lenses. This reduces the expense and/or allows for an optimum processing and marking on the spot.

The marking is done preferably by means of laser light. This makes possible a very simple marking at low expense and/or with very high precision. In particular, such a marking can also be used or applied with various materials and/or with the most varied geometric conditions. However, in principle, the marking can also be carried out in any other suitable way, for example, also by mechanical processing or engraving or the like.

The marking of the block piece that is to be processed is used in particular to make possible or to facilitate a translatory and/or rotary positioning of the lens that is to be processed on the block piece. In this connection, "translatory" is defined as a positioning that is, in particular, crosswise or perpendicular to a processing axis or a rotational axis of the block piece or the lens and/or at least essentially parallel to or on a support surface or front surface of the block piece that faces the lens. Here, in particular, "rotary" is defined as the rotary position or rotating position of the lens relative to the block piece or relative to the support surface or front surface of the block piece that faces the lens.

The markings that are applied to the block piece are arranged—at least partially—preferably along a circle or on a circle. This facilitates the positioning of the lens in or on the block piece, in particular when the lens is to be positioned on this circle with its usually circular outside diameter or with corresponding lens-side markings.

The markings can optionally also be applied along an edge area, along an edge, and/or along a lateral periphery, which is axially adjacent, for example, to a front surface of the block piece that faces the lens. Thus, a very universal marking that is adapted to the respective conditions is possible.

The marking of the block piece can be done based on a desired eccentric processing of the lens, in particular, i.e., also eccentrically.

The lens can further also be provided with markings, which preferably correspond to the markings on the block piece. This marking of the lens optionally also can be done only after processing a first side, in particular a surface side, of the lens.

After the marking of the block piece, the lens that is to be processed is locked, i.e., (temporarily) fastened on the block piece. Then, the lens can be in particular processed or further processed by cutting or shaping in some other way.

The apparatus for processing (working) the optical lens preferably has not only a processing apparatus for cutting or other shape-giving processing of the block piece and/or the lens and optionally a polishing apparatus for polishing the lens, but also in particular an input apparatus for the desired optical data of the lens and a control unit for generating lens-production data from the desired optical data and/or for determining geometric data of the lens from the desired optical data.

Thus, in a simple way and at low expense, in particular, also by less trained staff and/or on the spot, a processing of the lens can be carried out in such a way that the finished lens has the desired optical data, and thus, the desired optical properties. The desired optical data of the lens that is to be produced that are determined by the optician can be introduced in a simple way. An operator needs to input only these data, and optionally, output data from the lens that is to be processed or the lens blank in order to produce the lens with the desired optical properties. The additional data sets, which are subordinate to the desired optical data, are preferably produced by the apparatus itself.

The apparatus is especially preferably designed as a compact processing center.

The apparatus according to the proposal, in particular, has a common housing for at least one processing apparatus and the marking apparatus as well as, optionally, for other apparatus for polishing, cleaning, and/or locking. This allows for an especially compact and/or economical structure and/or a simplification of the expense, the control, and/or the operation. In addition, otherwise necessary external interfaces for transfer of data or transmission of information can be minimized or completely avoided.

Some of the previously-mentioned and subsequent aspects and features of this invention can be combined with one another in any way desired, but they can also be produced independently of one another.

Other aspects, features, advantages and properties of this invention follow from the detailed description of a preferred embodiment in conjunction with the accompanying drawings.

DETAILED DESCRIPTION OF THE INVENTION

Figure 1:
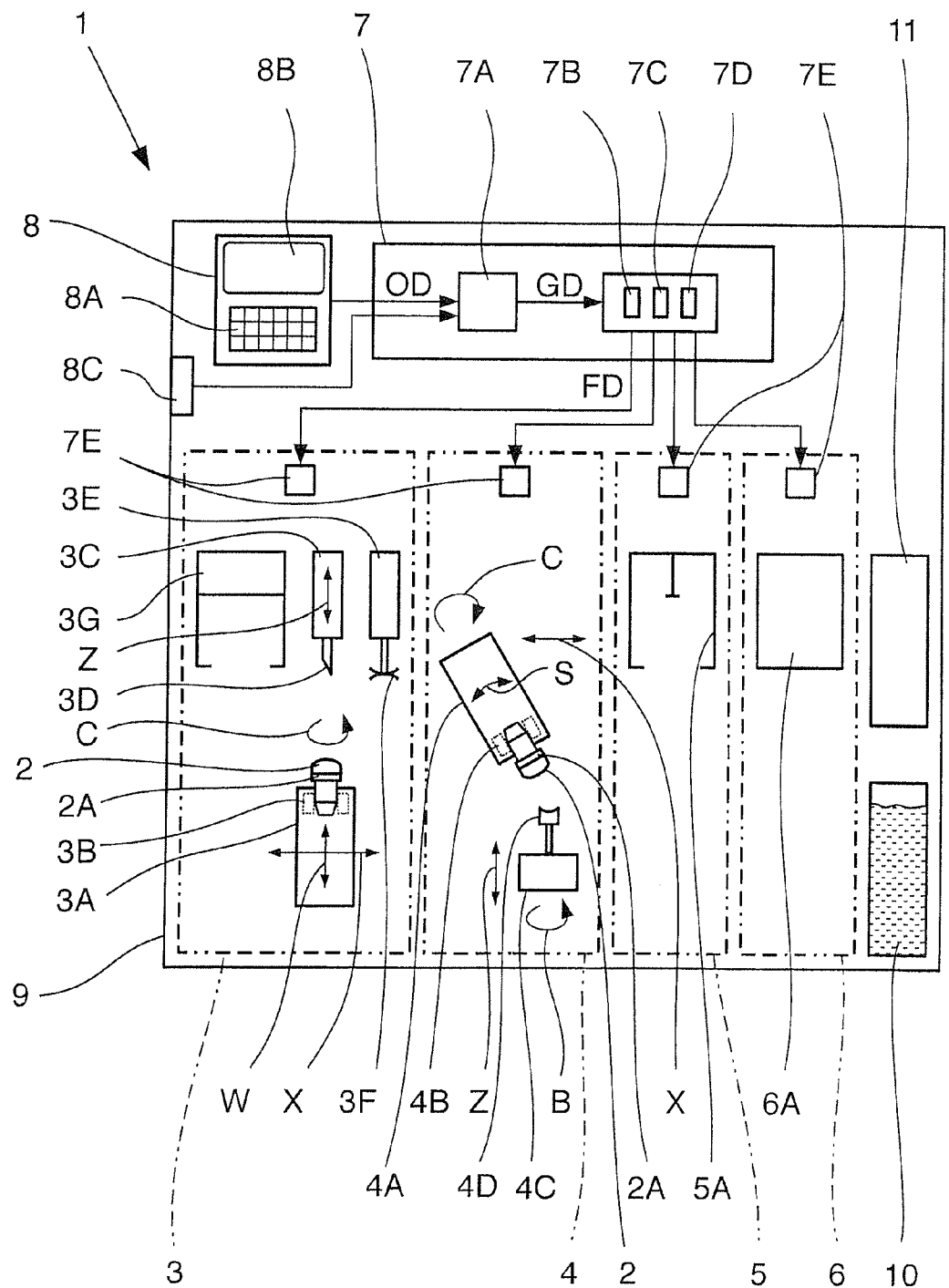
FIG. 1 shows a diagrammatic structure of an apparatus according to the proposal.

FIG. 1 diagrammatically shows an apparatus 1 according to the proposal for processing an optical lens 2. For the technological background of such an apparatus, reference must first be made to the introduction of the description.

The starting point for the development or processing of an optical lens 2 is a lens blank. The latter is processed by cutting or in some other shape-giving processing and in additional processing steps, in such a way that at the end, there is a finished optical lens 2 with the desired optical properties. Within the scope of this description, the term "lens" refers preferably both to the lens blank, before the necessary processing steps are performed, and to the finished lens 2, at the end.

The lens 2 or the lens blank preferably is made of plastic. However, in principle, another material that is to be processed in a suitable way, optionally also glass or mineral glass, can also be used. If the finished lens 2 is used or is to be used for eyeglasses (not shown), which preferably is the case, the lens 2 of this invention is also referred to as an eyeglass lens, even when the lens 2 optionally is not made of glass.

The apparatus 1 preferably has at least one or only one processing apparatus 3 for cutting or other shape-giving processing of the lens 2 as the workpiece that is to be processed. This processing apparatus 3 is indicated only diagrammatically in FIG. 1.

In the depicted and preferred embodiment, the processing apparatus 3 preferably has a workpiece spindle 3A, which preferably can be moved in the W-direction and the X-direction which, preferably, run crosswise or perpendicular to one another, via know means.

The workpiece spindle 3A is, in particular, a preferably direct-drive, precisely-mounted shaft or a direct drive or another drive in each case with a preferably integrated or assigned interface or receptacle 3B for the workpiece, i.e., here for the lens 2 or the lens blank. In principle, the lens 2 can be directly accommodated or clamped. Preferably, however, the lens 2 or the lens blank is held indirectly by a holding apparatus, in particular, a so-called block piece 2A. The block piece 2A is then clamped.

The lens 2 is temporarily connected to the block piece 2A. This state that is associated with the block piece 2A is referred to as "blocked" or "locked." The locking, i.e., temporary fastening, of the lens 2 to the block piece 2A can be accomplished, for example, by a block material, in particular a preferably low-melting alloy, such as a so-called alloy block material, a resin, an adhesive, a plastic, an adhesive strip, or the like and is sufficiently known from the state of the art.

In the illustrative example, the workpiece spindle 3A preferably has a receptacle 3B, in particular a collet chuck, for the block piece 2A.

The clamping of the lens 2 or the block piece 2A on the workpiece spindle 3A or receptacle 3B is preferably done by hand, i.e., manually by an operator, not shown. In principle, however, an automated clamping is also possible.

The lens 2 or the block piece 2A can preferably be clamped in a specific axial position and/or rotating position to be able to process the lens 2 in a defined manner. To this end, the block piece 2A can also be constructed in several parts, as known in particular from the state of the art.

By means of the workpiece spindle 3A, the clamped lens 2 can be turned or rotated for processing. The workpiece spindle 3A thus forms, in particular, a rotary drive for the lens 2. The workpiece spindle 3A forms, in particular, a calculated or controlled rotary axis C. In particular, a CNC control unit of the workpiece spindle 3A or the rotation of the lens 2 is accomplished. Especially preferably, the lens 2 is controlled or adjusted at a specific speed and/or can be turned or rotated with a defined rotating position.

In the embodiment shown, the workpiece spindle 3A with the clamped or locked lens blank 2 can be advanced or positioned in a processing tool preferably in the W-direction and/or can be moved or transported in the X-direction crosswise to the direction of advance (crosswise feed). In particular, a controlled W-axis and X-axis or linear axes are formed. In principle, other, or additional, directions and/or movement axes are also possible. In particular, the axial orientation of the axis of rotation or rotary axis C of the workpiece spindle 3A can also run obliquely to the W-direction or to the X-direction.

The processing apparatus 3 is preferably designed for processing the lens 2 by rotation, in particular front-rotation, and/or milling. However, the processing apparatus 3, as an alternative or in addition, can also make possible another—in particular, cutting or shape-giving—processing of the lens 2.

In the illustrative example, the processing apparatus 1 preferably has a drive 3C with a turning tool 3D and/or a milling drive 3E with a milling tool 3F. Here, in particular, i.e., the turning tool 3D or milling tool 3F is provided as a processing tool.

The lens 2 and the respective processing tool (here, turning tool 3D or milling tool 3F) can preferably be advanced and/or moved relative to one another to make possible the respective processing.

The drive 3C is preferably a complex, preferably electrically-operating axial drive, such as a moving coil drive, or the like, in particular a so-called fast-tool drive, to control or to quickly move back and forth the turning tool 3D in particular based on the rotating position of the lens 2 and/or based on the distance of the turning tool 3D from the axis of rotation of the workpiece spindle 3A in its axial position or Z-axis. The drive 3C allows for a preferably linear and/or controlled or regulated movement of the turning tool 3D and therefore preferably forms a controlled Z-axis.

The direction of the Z-axis, on the one hand, and the direction of the W-axis or the axial orientation of the axis of rotation or rotary axis C, on the other hand, can run parallel to one another or tilted relative to one another and/or can be adjusted relative to one another. With a relative slope, the latter is preferably small enough that the preferred front-rotation for processing the workpiece or the lens 2 can still be done in the desired or necessary way.

In connection with this invention, the term "axis" is especially preferably defined in terms of the terminology in CNC control units (digital or computer-controlled control units) as a controlled or regulated or calculated movement axis, such as a linear axis or rotary axis. This applies in particular for some or all parts of a processing apparatus and/or multiple processing apparatus or for the apparatus 1 as a whole according to the proposal.

The milling tool 3F and the assigned milling drive 3E are indicated only diagrammatically in FIG. 1. The orientation of the rotational axis or axis of rotation of the milling tool 3F preferably runs crosswise or perpendicular to the axial direction of the axis of rotation or rotary axis C of the workpiece spindle 3A. Depending on requirements and design with its orientation of the axis of rotation, the milling tool 3F can also be oriented or can pivot obliquely inclined in the axial direction of the axis of rotation or rotary axis C of the workpiece spindle 3A and/or can be advanced relative to the lens 2, for example, by corresponding movement of the workpiece spindle 3A and/or the milling drive 3E or the milling tool 3F.

In the depicted and preferred embodiment, the processing apparatus 3 is preferably designed in two stages, with a milling tool 3F operating in a coarser mode for coarse processing (pre-processing) and a turning tool 3D operating in a finer mode for finer processing (fine processing or main processing). If necessary, however, the processing by milling can also be completely eliminated. This results in a simplification of the apparatus 1 or processing apparatus 3 and allows for a more compact and/or more economical structure. If necessary, the turning can also be accomplished in two steps, such as a coarser preliminary turning and later fine turning, preferably with the same turning tool 3D, but optionally also with different turning tools.

In particular, a processing can be accomplished, for example, in the processing apparatus 3, or a structure can be provided, as described in EP 0 849 038 A2 or DE 10 2009 011 194 A2, which corresponds to U.S. Patent Application Publication 2010/0224039, for example.

The cutting or shape-giving processing is accomplished preferably by adding fluid, such as a cooling emulsion, or the like.

The apparatus 1, here in particular the processing apparatus 3, preferably also has a marking apparatus 3G, for example, a laser, to mark the lens 2, for example, with corresponding data, marks, or the like. This will be explained in greater detail later on. The marking apparatus 3G is preferably constructed as disclosed in EP 1 955 811 A1.

If necessary, a (first) edge processing of the lens 2 is also accomplished in the processing apparatus 3. However, as an alternative or in addition, an additional processing apparatus, not shown, such as a so-called edger, or the like, can also be provided for the edge processing.

It is also possible that the apparatus 1 or processing apparatus 3 is designed in such a way that the lens 2 can be processed in a cutting (working) or shape-giving way again after the actual shape-giving processing and after a coating, in particular, for the edge processing of the lens 2 or finishing the edge of the lens 2.

In addition to the processing apparatus 3, the apparatus 1 preferably has a polishing apparatus 4 for polishing or finishing the lens 2 or this lens blank that is processed in advance in the processing apparatus 3. In the embodiment depicted in FIG. 1, the polishing apparatus 4 is arranged preferably adjacent to and/or laterally beside the processing apparatus 3.

The polishing apparatus 4 can have a common housing with the processing apparatus 3 or a housing that is separate therefrom.

The polishing apparatus 4 is constructed or designed especially preferably as described in DE 10 2007 042 667 A1 and corresponding U.S. Patent Application Publication 2011/0009035, whereby the polishing apparatus 4 according to this invention can be designed, if necessary, also only for processing a lens 2 and not for simultaneous processing of two lenses 2; in particular, it can have, i.e., only one drive for rotating the lens 2.

In the illustrative example, the polishing apparatus 4 preferably has a workpiece spindle 4A with a receptacle 4B. The workpiece spindle 4A can be constructed in principle similar to or in the same way as the workpiece spindle 3A in the processing apparatus 3 and/or can be moved in the X-direction (crosswise feed) and/or can be pivoted as indicated by arrow S. In addition, reference is therefore made to the workpiece spindle 3A in the description. In particular, the workpiece spindle 4A is also used as a drive to rotate the lens 2 for the processing, here the polishing, and/or it serves to advance the lens 2 to a polishing tool 4D. In particular, the workpiece spindle 4A is a simple rotary drive, for example, a motor with a belt drive to rotate the lens 2 for the processing or the polishing. Especially preferably, the lens 2 or the block piece 2A is mounted without a defined rotating position and/or only rotated at a constant speed (optionally controlled or regulated depending on requirements).

In principle, the polishing can also be carried out only after unblocking, i.e., after the lens 2 is detached from the assigned block piece 2A. In this case, the lens 2 is preferably directly clamped.

The clamping of the lens 2 or the block piece 2A in the workpiece spindle 4A or the receptacle 4B thereof is preferably carried out in turn by hand, i.e., manually by an operator, not shown. Accordingly, a manual re-clamping from the workpiece spindle 3A to the workpiece spindle 4A is preferably also carried out. In particular, just like the clamping per se, in principle this re-clamping can also be carried out in an automated manner or automatically by means of a corresponding handling or clamping apparatus by the apparatus 1.

The separate drive or workpiece spindles 3A and 4A and/or receptacles 3B and 4B for the processing apparatus 3, on the one hand, and the polishing apparatus 4, on the other hand, make possible an independent processing (the polishing is also defined as processing, in particular as geometric or mechanical finishing of the surface) in the two apparatus 3, 4, in such a way that the throughput of the apparatus 1 on the processed lenses 2 is correspondingly higher compared to a common workpiece spindle for both apparatus 3, 4. However, in principle, instead of the separate or additional workpiece spindle 4A for the polishing apparatus 4, only one or the workpiece spindle 3A can be used together for the two apparatus 3, 4. If necessary, the polishing in the polishing apparatus 4 can also be accomplished simultaneously for multiple lenses 2 at the same time and/or in multiple processing steps.

The polishing apparatus 4 preferably has at least one polishing drive 4C with at least one assigned polishing tool 4D as a processing tool. The polishing drive 4C can turn the polishing tool 4D in particular, as indicated by arrow B.

Especially preferably, the polishing tool 4D can be pressed against or mounted on the lens 2 that is to be processed or the workpiece in particular with a predetermined force, here in the Z-direction in the illustrative example. The pressing or mounting can be accomplished, for example, pneumatically, by spring force and/or in another suitable way.

In addition or as an alternative, the polishing drive 4C or the polishing tool 4D can, if necessary, also be moved or slid in the X-direction, i.e., can form or have in particular a controlled X-axis, in particular, for relative adjustment (crosswise feed) relative to the workpiece or to the lens 2.

In addition or as an alternative to the possible pivoting movement S of the workpiece drive or the workpiece, the angle of the polishing tool 4D can preferably be adapted via a corresponding joint, such as a ball joint or a gimbal joint, onto the surface of the lens 2 that is to be processed.

A single polishing drive 4C is depicted with a single polishing tool 4D. Of course, multiple drives and/or tools can also be used. In particular, the polishing drive 4C can also be designed or mounted with multiple axes. For example, the polishing apparatus 4 can be designed or operated as described in DE 10 2007 042 667 A1.

The polishing is preferably accomplished by lapping, in particular, i.e., using a corresponding fluid containing friction elements, such as a so-called polishing milk, or the like. As an alternative or in addition, the polishing can also be done by fine grinding. In particular, instead of lapping, only a pure fine grinding can also be done for finishing the lens 2 in particular before a subsequent coating of the lens 2.

The polished or finished lenses 2 are preferably coated, in particular by means of the apparatus 1 or a coating apparatus arranged therein (this would preferably also depict a processing apparatus in terms of this invention) or another apparatus (not shown).

In principle, workpieces and tools can also be replaced or exchanged in the processing work that is described, in particular in the cutting or shape-giving processing and/or in the polishing, or a kinematic reversal can be provided.

The apparatus 1 optionally further has a cleaning apparatus 5 with a cleaning space 5A, in which the previously processed lens 2 can be cleaned. The cleaning apparatus 5 is designed to be separate here according to the preferred teaching—i.e., separate from the apparatus 3 and 4. In principle, it can also be integrated into, for example, the polishing apparatus 4.

The cleaning is preferably done manually, i.e., in a non-automated manner. For example, the still locked lens 2 or the lens 2 that is already detached from the assigned block piece 2A after the processing, in particular after the cutting processing (machining) in the processing apparatus 3 and/or after the polishing in the polishing apparatus 4, is cleaned, preferably washed or rinsed, in the cleaning apparatus 5. However, if necessary, the cleaning can also be accomplished in an automated manner and/or automatically and/or using a handling apparatus, not shown, and/or one of the workpiece spindles 3A or 4A, or crosswise slots.

As an alternative or in addition, the apparatus 1 can have an additional processing apparatus 6, indicated by way of example, with another processing space 6A. In the additional processing apparatus 6, for example, a coating of the processed lens 2 can be carried out, as already mentioned.

As an alternative, a locking of the lens 2 on the assigned block piece 2A and/or an unblocking of the lens 2 and/or a processing of the block piece 2A can be accomplished in the additional processing apparatus 6 or an additional processing apparatus (not shown). Relative to the optional processing of the block piece 2, it is noted that, in this connection, especially cutting or other shape-giving processing can be provided, for example, to adapt the block piece 2A to a lens 2 that is to be processed specially, for example, with an additional prism for correction of strabismus. This or another processing of the block piece 2 can be accomplished in the additional processing apparatus 6 or an additional processing apparatus, not shown, and/or in the processing apparatus 3, whereby depending on requirements, an additional processing tool can also be used with an optional additional drive.

Within the scope of this invention, "processing apparatus" in general is defined as any apparatus that provides or allows for a processing of the lens. In this respect, the term "processing apparatus" also comprises a polishing apparatus, a cleaning apparatus, and/or an engraving apparatus. In special cases, however, there is also the concept of "processing apparatus for cutting or other shape-giving processing of the lens." These are in particular the above-indicated special processing apparatus with a milling tool, with a turning tool, or with another shape-giving processing tool.

The apparatus 1 has a control unit 7, in any case, for controlling the shape-giving processing of the lens 2 or the processing apparatus 3, and once there, the polishing apparatus 4. The control unit 7 can also control additional apparatus 5 and 6 of the apparatus 1. The control unit 7 is diagrammatically indicated in FIG. 1. Details of the control unit 7 are further explained below.

The control unit 7 is provided or connected on the input side with an input apparatus 8 of the apparatus 1, which is configured in such a way that the desired optical data OD of the lens 2 can be input directly. The optical data OD, which are input with the input apparatus 8, are relayed to the control unit 7, which determines preferably geometric data GD of the lens 2 therefrom and/or determines or generates lens-production data FD.

In the embodiment, the input apparatus 8 preferably has a control panel 8A for manual input of the desired optical data OD and/or a display apparatus 8B, here in the form of a screen, in particular for user guidance. If necessary, the input apparatus 8 can also have a touchscreen as an alternative or in addition to the control panel 8A for input of the desired optical data OD. This touchscreen can, if necessary, be formed by the display apparatus 8B and/or an additional screen. It is important that the input apparatus 8 be designed in such a way that the optical data OD can be input in a simple, easily comprehensible way.

The display apparatus 8B preferably uses user guidance in the input of desired optical data OD and/or for an (easy) operation of the apparatus 1. The apparatus 1 especially preferably has only a single display apparatus 8B or only a single screen to make possible a simple, economical structure and/or to make possible or to facilitate an especially simple operation, even by at least largely unskilled staff.

In the display apparatus 8B, a dialog box preferably can be in particular a touchscreen. Then, the control panel 8A, which is indicated as a keyboard in FIG. 1, is in actuality integrated into the screen 8B. Of course, a rather traditional configuration with a (separate) keyboard as a control panel 8A is also possible as well.

A variant, in which the input apparatus 8 has an interface 8C for an electronic input or receptacle of the desired optical data OD, is also indicated in FIG. 1. In this connection, for example, this can be a card reader, a wireless interface, or an electrical connection, such as a USB interface.

The apparatus 1 or control unit 7 preferably has a design module 7A for determining or generating geometric data GD and/or production data FD from the desired optical data OD. FIG. 1 can detect how the optical data OD from the input apparatus 8 preferably are relayed to a first stage of the control unit 7, namely to the design module 7A. In the depicted and preferred embodiment, the design module 7A contains a design model, with whose assistance geometric data GD of the lens 2 to be produced are developed or generated from the input optical data OD in a determination process. The design model or a group of preferably stored design models results, in particular, in the design module 7A preferably with the structure of algorithms explained in the general part of the description or by an approximation, interpolation, or the like to form the geometric data GD of the lens 2.

The term desired "optical data" preferably relates to the optionally highly individualized optical data of the lens that are determined for the respective patients, which are typically determined by an optician, or to the optical nominal data of the lens that is to be produced. In particular, in this invention, the "optical data" comprise the spherical optical action, for example, in diopters, information regarding a cylinder for correcting astigmatism (for example, thickness of the curvature, in particular in diopters and position of the cylindrical axis, for example, in degrees), information regarding a prism, in particular for correcting strabismus (for example, tilting or thickness of the prism, position and shape of the prism, axis of the prism, or the like), the inter-pupillary distance (distance between the eyes for the positioning of the lenses in the eyeglass frame), the fitting height (height from the lower edge of the lens to the center of the eye), the edge shape (for example, round, indicating the diameter, or oval, indicating the minor and major axes of the ellipse or some other shape) and/or information regarding the angular position of the lens relative to the eyes or in the eyeglass frame (pantoscopic angle, face form angle to indicate the slope of the lens plane relative to the optical axis of the eye in the horizontal, or the like).

According to the invention, the term "geometric data" of the lens refers to the data or values that describe the geometric properties of the lenses, such as diameter, thickness, optionally at various points, curvature at various points, etc. The "geometric data" represent in particular the data or values that should or must have the (finished) processed lens or a surface of the lens to achieve the desired optical data or properties. The geometric data can refer, for example, only to one side, such as the front side or rear side of the lens, or at least to a side that is just about to be processed or finished, but also to both sides, the edge and/or the thickness or the thickness variation of the lens. For example, the geometric data can indicate or specify a desired surface variation or a desired surface shape of the lens that is to be processed. This can be carried out by, for example, corresponding parameters, such as the radius of a sphere and/or a torus, by a function, an approximation, by coordinate values, by CAD data and/or values corresponding thereto, or the like. The geometric data can also comprise, for example, a thickness, various thickness values, or a thickness variation of the lens that is to be finished (manufactured). The geometric data can also comprise an edge path, in particular in the lens plane along the edge, and/or an edge shape, for example, the design of one or more bezels along the edge, and/or the design of a groove (position, shape) along the outer edge, or the like. The geometric data are in particular data of the lens that is to be finished, i.e., threshold data or threshold values, set point values or the like, even when partially only an approximation and not a complete mathematical description or functional representation is possible.

In particular, the geometric data thus relate, i.e., to a finished surface of the lens or the finished lens. This invention in particular deals with the production of lenses with free-form surfaces, whereby "free-form surfaces" in terms of this invention are distinguished in particular in that no closed mathematical representation or only an approximate mathematical representation, for example, by bi-cubic or higher splines, or the like, is possible.

According to the invention, the term "production data" refers in particular to the data with which preferably a specific processing apparatus is actuated to implement a specific processing process. These are, in particular, data that control the movement of corresponding processing tools and/or corresponding processing processes. For example, the production data can be so-called CNC data, or the like. As an alternative or in addition, for example, the production data can also represent or comprise and contain geometric data from intermediate steps in the processing or different processing processes and/or optionally completely replace the geometric data.

In addition, the geometric data and/or production data also contain or take into consideration a certain oversize or a possible undersize—in particular, with respect to the subsequent processing steps, such as grinding, polishing, or coating.

According to the invention, "design model" is defined, in particular, as that which is called "lens design" among experts. The design model can be specific to a distributor of lens blanks. In particular, it comprises all of the algorithms or essential algorithms with which the geometric data of the special lenses are determined from the desired optical data. The geometric data depend, in particular, on the lens material, the refractive index, size, shape, thickness, lens type, manufacturer and/or the type of binding, or the like (the latter or similar information that relates in particular to the lens blank or the lens in the initial state or before the processing and/or an unambiguous identification are preferably referred to, according to the invention, as "output data, starting data" which in particular are lens-specific), and/or optionally on possible approximations of the design model. On the way from the lens blank to the finished lens, optionally, various methods can also be pursued. The specifically selected processing method of the respective manufacturer of the lens blank and/or the processing machine is electronically usable or is taken into consideration in particular in the design model and/or in the generation of the production data.

From the desired or input optical data OD, the geometric data GD in a first step and the production data FD in a second step, or as an alternative, also directly the production data FD—optionally also different production data FD for different processing steps—are established, determined and/or generated by the apparatus 1, by the control unit 7, and/or by means of the design module 7A or design model. In this connection, in particular, also the output data AD of the lens 2 that is to be processed or the lens blank that is to be processed, such as lens type, size, shape, thickness, lens material, refractive index, and/or the type of blocking, or the like, are taken into consideration. If necessary, these output data AD can be input and/or selected in particular via the input apparatus 8, and/or automatically acquired or determined by the apparatus 1 or control unit 7. In particular, the control unit 7 or the design module 7A can select a corresponding or suitable design model based on these output data of the lens blank.

As an alternative or in addition, the apparatus 1 or the control unit 7 or the design module 7A can be designed in such a way that based on the optical data OD and/or the geometric data GD resulting therefrom, the optimum lens blank or lens type—in particular, from a preset or presettable group of available lens blanks or types—can be selected automatically and optionally can be indicated in particular to the operator.

The operator can then clamp the corresponding lens blank in the first processing apparatus, here the processing apparatus 3 or its workpiece spindle 3A or its receptacle 3B. If the required lens blank specifically should not be available, the operator can input the latter preferably so that then another suitable lens blank can be requested from the apparatus 1 or control unit 7. However, other processes or user guidance are also possible here. It is to be noted that the term "user guidance" in particular comprises the guidance of an operator, not shown, especially preferably via the display apparatus 8B or other apparatus, with respect to the operation of the apparatus 1 and/or supplying resources, tools, or the like.

The design model can be preset, input and/or changed; this depends in particular on the configuration of the control unit 7 or the design module 7A. Preferably, a specific group of design models is stored in the apparatus 1, in the control unit 7, or in the design module 7A, and can be selected from these design models, if necessary.

The determination of the lens data from the optical data OD is accomplished, according to the preferred teaching, in such a way that for each lens 2, a particular determination process for the geometric data GD or production data FD is carried out. A separate determination process for determining the geometric data GD from the optical data OD or, directly, the production data FD from the optical data OD for each individual lens 2 is of special importance, also to be able to generate an unambiguous accounting. Each determination process of geometric data GD or production data FD is preferably counted and cleared and/or only carried out as a separate determination process when a corresponding activation code or another release or the like is present. The apparatus 1 or control unit 7 or the design module 7A is preferably designed in such a way that a determination process is carried out only after a corresponding release and/or each determination process is counted and/or cleared. The input of a corresponding activation code can be accomplished in particular via the input apparatus 8 or the interface 8C or in another suitable way.

The apparatus 1 or the control unit 7 preferably further has a production module 7B, with which the production data FD for the processing apparatus 3 and optionally also for the polishing apparatus 4 are now generated from the specific geometric data GD of the lens 2. Also, for the additional processing apparatus 5 or 6 of the apparatus 1, the corresponding production data FD can be generated by means of the production module 7B.

In addition, in the depicted embodiment, a distribution of the production data FD is carried out preferably in various processing steps. This can be accomplished, for example, via a sequence control unit 7C, indicated in FIG. 1, of the apparatus 1 or control unit 7 and/or in some other way.

In the apparatus 1 or control unit 7, a user guide apparatus 7D can also be integrated, which then makes possible—in particular via the display apparatus 8B of the input apparatus 8—the feedback to the user or operator or the user guidance.

In principle, it is also possible to be able to produce or to generate the production data FD without the intermediate step of the geometric data GD of the lens 2 directly from the desired optical data OD of the lens 2, as already mentioned. This depends in particular on the configuration and/or programming of the apparatus 1 or control unit 7.

In the depicted and preferred embodiment, each individual apparatus 3, 4, 5 and 6 preferably has its own assigned apparatus control unit 7E. These apparatus control units 7E are integrated in the depicted and preferred embodiment, preferably into the respective apparatus 3, 4, 5 and 6. They can also, however, be integrated at least partially or completely into the control unit 7 or other components of the apparatus 1 or can be formed therefrom. Usually, the apparatus control units 7E are CNC control units.

In general, it is to be noted that the control unit 7 can be formed by or can contain a memory-programmable control unit, CNC control unit (digital or computer-supported control unit), or the like, and/or can control such a control unit. The control unit 7 or parts of the control unit can also be combined arbitrarily for the apparatus 3 to 6 and/or divided arbitrarily among the apparatus 3 to 6 or can be formed only by the latter.

The depicted and preferred embodiment shows the apparatus 1 as a compact processing center, here and according to preferred teaching in or with a common housing 9. As a result, the apparatus 1 according to the invention can be installed preferably completely with all apparatus on a suitable spot. In particular, here, this is a compact apparatus 1 in the form of a processing center that can be set up on any site.

Preferably, the control unit 7 and/or the input apparatus 8 is/are firmly embedded, integrated or thus firmly connected and/or firmly attached thereto—in particular via a cable, not shown—into the apparatus 1 or its housing 9.

The depicted and preferred embodiment also shows, diagrammatically indicated in FIG. 1, another tank 10, in which a necessary fluid, for example, a polishing agent, a cleaning fluid, a cooling lubricant, or the like, can be stored. Consequently, the tank 10 can also be divided, if necessary. The tank 10 can also be formed or supplemented by multiple individual tanks that are separate from one another.

Finally, FIG. 1 also shows, diagrammatically indicated, another receiving apparatus 11, which can be used, for example, for storing tools, block pieces, lens blanks, or the like.

According to the preferred teaching of the invention, the apparatus 1 can also be configured in such a way that the state of the apparatus 1 and/or individual apparatus 3-6 of the apparatus 1 and/or other informational data, such as the number of determination processes, the type or number of the processed lenses 2, or the like, can be queried and/or influenced from afar. This uses in particular monitoring or maintenance, but in particular it is not intended for the continuous operation of the apparatus 1. To this end, corresponding interfaces can then be provided for connection to the Internet, to a telephone network or a radio network (for example, via a preferably integrated GSM module) or some other network. In this connection, the interface 8C optionally also can be used.

Figure 2:
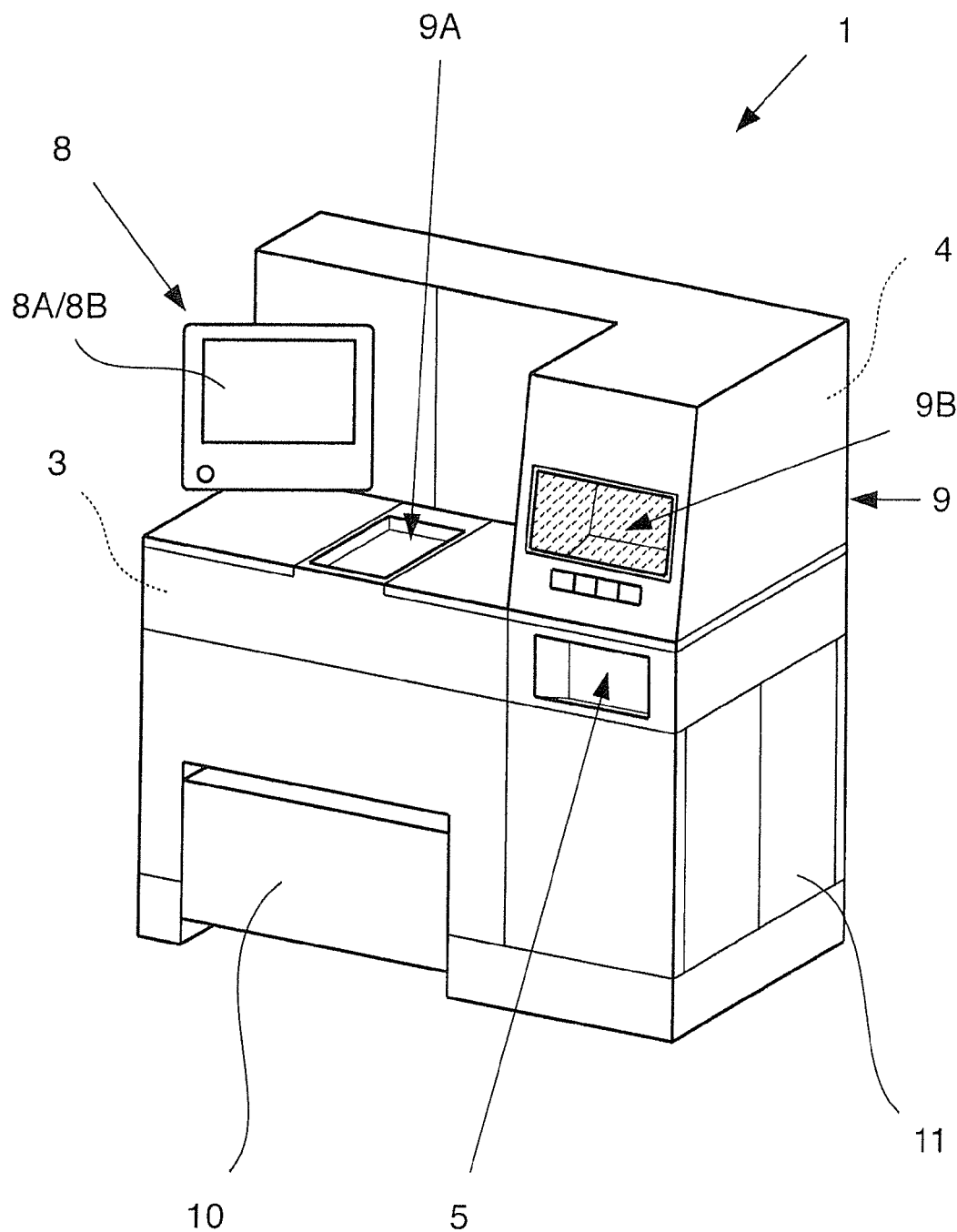
FIG. 2 shows a diagrammatic perspective front view of the apparatus.

In a diagrammatic, perspective view, FIG. 2 shows the apparatus 1 according to the invention in a possible configuration in the form of a processing center in the compact housing 9. The housing 9 preferably has an input flap 9A for the processing apparatus 3, here only indicated, that is located in particular below in the housing 9. The polishing apparatus 4 is preferably arranged on the right in the housing 9. An input flap 9B for the polishing apparatus 4 is provided on the housing 9 in the front in the area of the polishing apparatus 4. As an alternative, the input flap 9B can also be arranged, for example, beside the input flap 9A at least essentially at the same height or in a common plane and/or with an at least essentially identical orientation, whereby the polishing apparatus 4 then is arranged preferably under it and not behind it.

Based on the representation in FIG. 2, it can be seen that the reclamping of a lens 2 or a lens blank with its block piece 2A from the processing apparatus 3 is preferably accomplished manually in the polishing apparatus 4 by an operator.

An opening of the cleaning apparatus 5 is preferably arranged below the input flap 9B or the polishing apparatus 4 or at some other suitable spot. The tank 10 is indicated or arranged preferably below on the housing 9. The input apparatus 8 with the display apparatus 8B and/or the control panel 8A, here in particular in the form of a touchscreen, is preferably located on the top left on the housing 9.

The apparatus 1 or its housing 9 preferably also has the receiving apparatus 11, in particular for tools, block pieces 2A, lenses 2, or lens blanks, and/or other resources. The receiving apparatus 11 here in the illustrative example is preferably arranged laterally.

Figure 3:
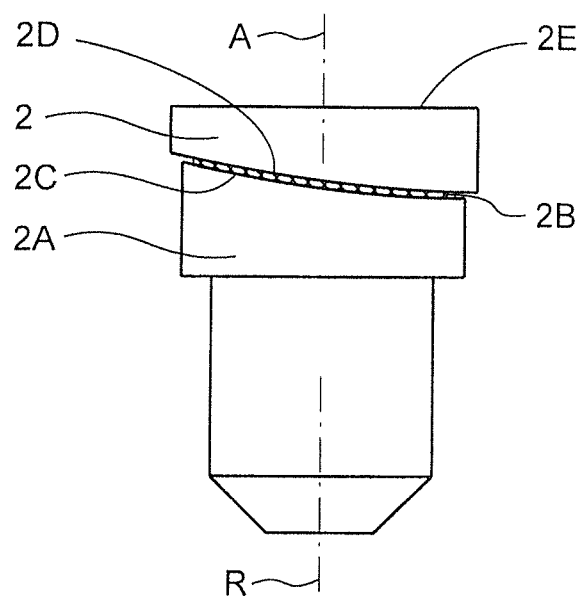
FIG. 3 shows a diagrammatic view of a processed block piece with an assigned lens.

In an only very diagrammatic representation, FIG. 3 shows the block piece 2A with a lens 2 that is assigned or locked thereto. The lens 2 is connected or can be connected in particular by means of a block material 2B to the block piece 2A. The block material 2B is, for example, a low-melting material, preferably a readily melted alloy, a plastic, an adhesive, an adhesive layer, an adhesive strip, or the like.

The lens 2 can be connected or is connectable to the block piece 2A or a front surface 2C of the block piece 2A more or less over the entire surface or only in certain areas, for example, only at certain support points or in certain support areas.

The lens 2 can be preferably directly supported on the block piece 2A or the front surface 2C thereof, especially preferably in corresponding support points or support areas. This is described in, for example, WO 2007/017385 A2 and corresponding U.S. Patent Application Publication 2008/0132157, which is incorporated herein by reference in this connection as a supplementary disclosure. The above-mentioned support points or support areas can optionally also be designed to be raised and/or the front surface 2C can be provided with one or more recesses or the like, so that the block material 2B can connect the block piece 2A and the lens 2 in the desired way in the areas between the support points or support areas and/or in the recesses or the like. However, a connection by an almost negligible adhesive layer, intermediate layer of an adhesive strip or the like, optionally also between the support points or sectional areas on the one hand and the lens 2 on the other hand, can also be carried out.

As an alternative, the lens 2 can also be connected via the block material 2B to the block piece 2A some distance away from the block piece 2A. In this case, a corresponding axially spaced positioning, for example, via a corresponding support means, such as a block ring or the like has to be carried out, in particular as described in DE 10 2008 022 660 A1 and corresponding U.S. Patent Application Publication 20011/0096290, which in this connection is incorporated herein by reference as a supplement to this disclosure.

If necessary, the block piece 2A is designed in one or multiple parts. For example, the block piece 2A can have a removable or separable head that forms the front side or front surface 2C.

The block piece 2A or its head is processed preferably by cutting (machining) or shaping in some other way, in particular for adapting the front side or front surface 2C to the assigned lens 2 that is to be processed. For example, the block piece 2A or its front side 2C is adapted to a prism of the lens 2 or a prism-like design of the lens 2 and/or to the block side 2D of the lens 2 that faces the block piece 2A—at least in certain areas, in particular at least in support points or support areas. This adaptation is achieved by the above-mentioned processing of the block piece 2. In this connection, in particular a front-side material removal is carried out on the block piece 2A.

The block piece 2A or its head is preferably produced at least partially from plastic, in particular for facilitating the processing and/or marking.

The above-mentioned processing of the block piece 2A is preferably carried out in or by means of the apparatus 1 and/or its processing apparatus 3 or another processing apparatus 6 or the like. However, the processing of the block piece 2A in principle can also be done separately.

The processed block piece 2A is connected or bound to the lens 2 that is to be (further) processed, in particular using the block material 2B, as indicated in FIG. 3, or in some other suitable way.

When binding the lens 2 to the block piece 2A, (correct) positioning of the lens 2 on or in the block piece 2A or its front side 2C is difficult and/or essential. In particular, a translatory positioning, i.e., a positioning of the lens 2 crosswise to a clamping axis or axis of rotation or rotational axis R of the block piece 2A is necessary, in particular to orient the desired processing axis A of the lens 2 correspondingly coaxially, i.e., to avoid a crosswise offset and/or an oblique position. Further, in particular a correct rotary positioning of the lens 2 in or on the block piece 2A is important to make possible a correct processing, in particular in the case of non-rotationally-symmetrical lenses 2, and/or to avoid an undesirable tilting of the desired processing axis A toward the rotational axis R. In other words, the rotational positioning uses the orientation of the rotational position of the lens 2 toward the block piece 2A.

Only after correct positioning or only with correct positioning is the lens 2 that is being processed connected or is to be connected to the block piece 2A or its front side 2C or is the binding carried out.

Then, in particular cutting or shape-giving processing of the locked lens 2, in particular an edge processing of the lens 2 and/or a processing of the processing side 2E of the lens 2 opposite to the block side 2D, can be carried out.

To facilitate or to make possible the above-mentioned positioning, the block piece 2A or its front side 2C is marked, in particular provided with markings (the markings are not shown in FIG. 3). This marking is preferably carried out directly after the cutting or shape-giving processing of the block piece 2A and/or in the apparatus 1 and/or by means of the marking apparatus 3G or another marking apparatus.

Figure 4:
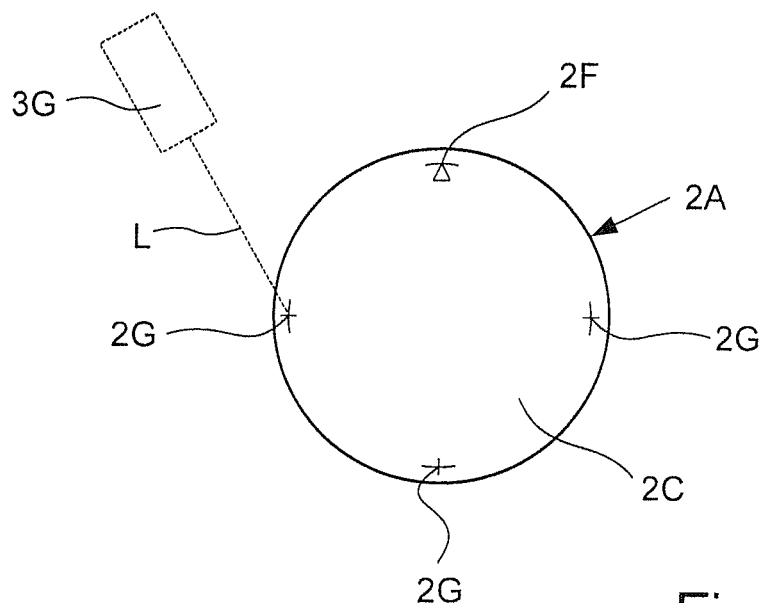
FIG. 4 shows a diagrammatic top view of the block piece without a lens.

In a diagrammatic top view, FIG. 4 shows the block piece 2A or its front side 2C without the lens 2, whereby the marking is indicated by dotted lines, here preferably by means of the marking apparatus 3G or by means of laser light L. The marking is preferably done by the same marking apparatus 3G that is also used for the marking of lenses 2, but in this connection, it can also be a separate marking apparatus.

As already mentioned, the marking of the block piece 2A is preferably done in the apparatus 1 and/or with the same clamping of the block piece 2A as during the processing of the block piece 2A, for example, in the receptacle 3B. The processing of the block piece 2A is preferably done with the processing apparatus 3, which also uses the processing of the lenses 2. If necessary, however, another or the additional processing apparatus 6 or the like can also be used for cutting or shape-giving processing of the block piece 2A and/or marking of the block piece 2A.

The block piece 2A or the front surface 2B thereof is provided or marked with markings, preferably with one or multiple markings 2F, 2G.

The markings 2F, 2G preferably comprise at least one unambiguous marking 2F or a marking 2F that is distinct from the others, which is especially characterized here by a triangle or the like and/or serves to ensure the rotary positioning of the lens 2. Preferably, at least one or only exactly one marking 2F is distinguished from the other markings 2G. This unambiguous marking 2F uses in particular rotary positioning or an unambiguous identification of a specific rotating position.

The markings 2F and 2G are preferably arranged along a circle or at least partially on a circle, as indicated in the diagrammatic top view according to FIG. 4. Other arrangements of the markings 2F, 2G are also possible, however.

Figure 5:
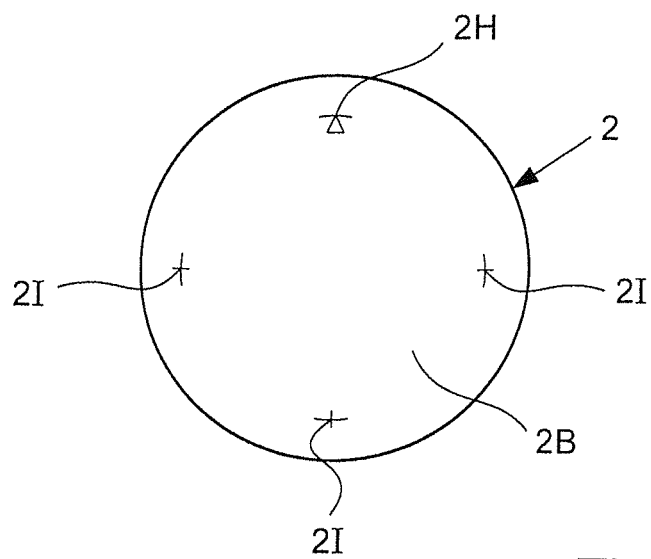
FIG. 5 shows a diagrammatic top view of the lens without a block piece.

The markings 2F, 2G can correspond, for example, to an outside diameter of the lens 2 and/or to preferably corresponding markings 2H and 2I of the lens 2, which are diagrammatically indicated by way of example in the top view of the lens 2 or the block side 2D thereof according to FIG. 5. For example, the lens 2 is provided with the preferably unambiguous marking 2H, which is used in particular in a rotary positioning or identification of the rotating position of the lens 2 and/or corresponds in particular to the—preferably also unambiguous—marking 2F of the block piece 2A. The additional markings 2I of the lens 2 preferably correspond to the markings 2G of the block piece 2A.

For positioning, the markings 2F, 2G of the block piece 2A and the markings 2H and 2I of the lens 2 are preferably overlapped. This allows for a very simple positioning.

The positioned lens 2 is bound with the block piece 2A.

Then, the (further) processing of the lens 2, in particular on the surface side or processing side 2E that faces away from the block piece 2A, and/or an edge processing of the lens 2 and optionally also the block piece 2A can be carried out.

If necessary, the lens 2 has already been processed (worked), in particular, by cutting or shaping in the apparatus 1 or processing apparatus 3 or in some other way, in particular, on the block side 2D. In particular in this case of a first processing of the lens 2 on the subsequent block side 2D, the lens 2 is preferably marked just like the block piece 2A, provided in particular with the markings 2G and 2I, as indicated by way of example in FIG. 5. This marking of the lens 2 can in turn be carried out in the apparatus 1 and/or processing apparatus 3 and/or by using the marking apparatus 3G or some other marking apparatus.

In the (first) processing of the lens 2 on the subsequent block side 2D thereof, the lens 2 first can be locked on its processing side 2E that is to be processed later. This is not shown in the figures, however.

The lens 2 must not, however, already be processed by cutting (machining) or shaping on the block side 2D thereof. Rather, the block side 2D of the lens 2 or the lens blank can be formed by pouring, whereby the block side 2D can be coated in particular in the usual way and/or can be provided with a protective film. Further, this block side 2D or this lens or this lens blank can also already be marked in advance or at the factory or can be marked first on the spot or in the apparatus 1.

With respect to the preferred position of the markings 2F and 2G on the block piece 2A or the front side 2C thereof or with respect to the method for marking, it is noted that the marking can depend on a desired eccentric processing of the lens 2, and in particular, also an eccentric marking—in particular, relative to the rotational axis R and/or an outside diameter of the lens 2—is possible, and/or that the marking based on a desired processing and/or the previous processing of the lens 2 can vary or be carried out.

In the illustrative example, FIG. 5 is distinguished from FIG. 4 essentially only in that the lens 2 has a larger diameter than the block piece 2A. The markings 2H and 2I are accordingly located further from the outer edge than the markings 2F and 2G.

The markings 2F and 2G on the block piece 2A and, if present, the markings 2H and 2I on the lens 2 preferably do not lie in areas that are covered by the block material 2B. Rather, these markings lie in particular outside of the block material 2B or in intervening areas not covered by the block material 2B. The block material 2B can, as already mentioned, be arranged, for example, only in certain areas, in particular only in areas of certain spots or points or ring sections or the like, so that in particular intervening markings are or remain visible.

As an alternative or in addition, the markings 2F and 2G can also be arranged or applied directly adjacent to the outside edge of the front surface 2C and/or laterally on the block piece 2A, in particular in a ring area of the block piece 2A that is axially adjacent to the front surface 2C.

As an alternative or in addition, some or all markings 2F and 2G on the block piece 2A can also extend radially, in the peripheral direction, and/or axially on the block piece 2A and/or can extend or be applied from the front surface 2C over the edge axially on the block piece 2A.

If necessary, the markings 2F, 2G, 2H and/or 2I can also be arranged on such a large radius and/or laterally or eccentrically and/or in such areas that these markings 2F, 2G, 2H and/or 2I are removed during later edge processing, whereby optionally both the lens 2 and the block piece 2A can be removed laterally during the edge processing.

As already mentioned, the block material 2B can also be formed by, for example, an adhesive layer or the like. It is also possible, for example, that the block material 2B or the adhesive layer—in particular only after the processing of the block piece 2A if such a processing is done—is applied on the front surface 2C, and the block material 2B or the adhesive layer is provided or marked with one or multiple markings 2F, 2G. This marking is defined in terms of this invention preferably also as marking of the block piece 2A.

As an alternative or in addition, a protective film, not shown, on the lens 2 or the block side 2D with one or multiple markings 2H, 2I can also be provided. This marking is also preferably defined in terms of this invention as marking of the lens 2. This protective film uses in particular a protection of the lens 2 or the already processed or finished block side 2D of the lens 2.

In the illustrative example, the lens-side markings 2H, 2I are preferably arranged on the block side 2D or optionally on an assigned protective film or the like. However, if necessary, these markings can also be applied at other suitable spots of the lens 2, optionally in the lens 2 or else on the processing side 2E that is still to be processed. The possible position of the markings or attachment primarily depends on how the positioning is carried out. In particular, the markings that correspond to one another—here, for example, the lens-side markings on the block piece markings—can be spaced in axial direction or in the direction of the lens thickness 2 when based on a set angle of observation; for example, by means of a correspondingly arranged camera or the like, an exact or correct positioning is made possible or ensured.

Individual features of the various processing steps (marking steps), or processing apparatus and/or the apparatus 1 or the control unit 7 can also be produced independently of one another and in any combination.

What is claimed is:

1. Method for processing an optical lens, comprising the steps of:
   marking a block piece for a lens that is to be processed with at least one marking for positioning of the lens on the block piece, and
   using the at least one marking for positioning of the lens on the block piece,
   wherein said at least one marking is applied using laser light,
   wherein the block piece is processed in a shape-imparting manner before marking,
   wherein the lens is connected to the block piece after marking and then is processed in a shaped-imparting manner with a turning tool and
   wherein processing of the block piece, marking of the block piece, and processing of the lens are carried out in the same device.

2. Method according to claim 1, wherein the block piece is clamped in a receptacle and the marking of the block piece is done with the same receptacle of the block piece as during the processing of the block piece.

3. Method according to claim 1, wherein the block piece is marked eccentrically for eccentric processing of the lens.

4. Method according to claim 1, wherein the lens is a non-rotationally-symmetrical lens, and wherein the turning tool is moved based on the rotational position of the lens by means of a fast-tool drive.

* * * * *